United States Patent
Gaffoor et al.

(10) Patent No.: US 11,732,718 B2
(45) Date of Patent: Aug. 22, 2023

(54) MULTI-STAGE ROTOR

(71) Applicant: Feizal Alli Gaffoor, Johannesburg (ZA)

(72) Inventors: Feizal Alli Gaffoor, Johannesburg (ZA); Ali Feizal Gaffoor, Johannesburg (ZA)

(73) Assignee: Feizal Alli Gaffoor, Johannesburg (ZA)

(*) Notice: Subject to any disclaimer, the term of this patent is extended or adjusted under 35 U.S.C. 154(b) by 0 days.

(21) Appl. No.: 17/761,439

(22) PCT Filed: Sep. 29, 2020

(86) PCT No.: PCT/ZA2020/050053
§ 371 (c)(1),
(2) Date: Mar. 17, 2022

(87) PCT Pub. No.: WO2021/068008
PCT Pub. Date: Apr. 8, 2021

(65) Prior Publication Data
US 2022/0243732 A1      Aug. 4, 2022

Related U.S. Application Data

(60) Provisional application No. 62/907,730, filed on Sep. 30, 2019.

(51) Int. Cl.
*F04D 1/08*    (2006.01)
*F02C 6/12*    (2006.01)
(Continued)

(52) U.S. Cl.
CPC .................. *F04D 1/08* (2013.01); *F02C 6/12* (2013.01); *F04D 17/122* (2013.01); *F04D 29/286* (2013.01)

(58) Field of Classification Search
CPC ......... B64D 13/06; F01D 25/12; F01D 9/026; F02B 33/40; F02B 37/00; F02B 39/08;
(Continued)

(56) References Cited

U.S. PATENT DOCUMENTS

| 945,742 | A | * | 1/1910 | Boeckel et al. | ........ F01D 5/022 |
| | | | | | 415/55.1 |
| 2,428,330 | A | * | 9/1947 | Heppner | ................. F02C 3/073 |
| | | | | | 417/247 |

(Continued)

FOREIGN PATENT DOCUMENTS

| GB | 191413852 | 6/1915 |
| GB | 594522 | 11/1947 |
| GB | 2485835 | 5/2012 |

OTHER PUBLICATIONS

Search report and written opinion dated Jan. 15, 2021 in International Application Serial No. PCT/ZA2020/050053.

*Primary Examiner* — Jesse S Bogue
(74) *Attorney, Agent, or Firm* — Billion & Armitage

(57) ABSTRACT

This invention relates to a multi-stage rotor (10). More specifically, the invention relates to a multistage rotor (10) for the compressor stage of a machine that, through a concentric configuration of its innermost (12), outermost (24) and intermediary (16) blade sets co-operative with a reverse flow convoluting ducting arrangement, provides an axially compact, lighter and more easily maintainable compressor rotor for such machine. The multi-stage rotor (10) includes innermost (30), outermost (34) and intermediary (32) duct ports comprising a radial duct spans, as measured between respective diametrically inner and outer duct walls of the duct port, being greater than respective innermost (48), outermost (54) and intermediary (50, 52) radial blade spans of the respective blade sets rotatable at least partially within such duct port. In this manner, a gap is defined between: (i) the at least one diametrical ends of the radial rotating blades ending radially short of the respective radial duct span to form free ends of the blades; and (ii) a stationary part of the respective duct the free ends of the blades sweep neared to; for generating a friction wash between such free (Continued)

ends of the blades and the stationary part of the respective duct.

23 Claims, 7 Drawing Sheets

(51) Int. Cl.
*F04D 17/12* (2006.01)
*F04D 29/28* (2006.01)

(58) Field of Classification Search
CPC .... F02C 3/045; F02C 3/05; F02C 6/12; F04D 25/024; F04D 29/284; F05D 2220/40; F05D 2250/36; F05D 2260/213; F25B 1/053; Y02T 10/12; Y02T 50/60
See application file for complete search history.

(56) References Cited

U.S. PATENT DOCUMENTS

| | | | | |
|---|---|---|---|---|
| 6,647,707 | B2* | 11/2003 | Dev | F02C 3/16 |
| | | | | 60/39.43 |
| 8,192,141 | B1* | 6/2012 | Dale | F04D 19/022 |
| | | | | 415/199.5 |
| 10,344,763 | B2* | 7/2019 | Rez | F04D 29/284 |
| 2019/0063313 | A1* | 2/2019 | Rez | F02C 3/145 |

\* cited by examiner

MULTI-STAGE ROTOR

BACKGROUND OF THE INVENTION

THIS invention relates to a multi-stage rotor. More specifically, the invention relates to a multi-stage rotor for the compressor stage of a machine (e.g. gas-turbine engines, electrical generators, pumps, gas compressors, turbochargers and the like) that, through a concentric configuration of its multi-stage blades co-operative with a reverse flow convoluting ducting arrangement, provides an axially compact, lighter and more easily maintainable compressor rotor for such machine.

Although the focus of the invention is on compressor rotors, it will be appreciated that the multi-stage rotor can be applied to many alternative applications, for example, as a multi-stage rotor for the turbine stage of the same or other machines.

Compressors are well known and typically fall into two categories, namely reciprocating compressors and rotary-type compressors. Reciprocating compressors are well known in their use in internal combustion engines (i.e. motor vehicle and small aircraft industries), in steam engines and for air compressor machines, but of less interest for the purposes of this description.

Rotary-type compressors, particularly for high pressure requirements, typically take the form of axial compressors or centrifugal compressors. In axial compressors, air is drawn in and compressed by multiple alternating rows of rotor blades and stator vanes spaced apart axially along a shaft. The rotor blades incrementally increase the air velocity while the stator vanes incrementally do the opposite, with the net effect being an increased air pressure deliverable by the compressor.

In centrifugal compressors, air is drawn in axially by an impeller with blades thereof imparting energy to the air as it accelerates under centrifugal force radially through a diffuser, which causes a decrease in air velocity and an increased air pressure.

Although axial compressors and centrifugal compressors are used on large scale in industry, each have their disadvantages. Axial compressors are heavy and axially lengthy to accommodate the multiple axial stages of compression. Furthermore, service downtime can be extensive, particularly where repair or replacement of a rotor blade far down the shaft is required.

Centrifugal compressors have lower running and maintenance costs, require less start-up torque and are less lengthy in axial dimension. However, centrifugal compressors are not particularly suitable for multi-stage compression, due to its "swan" shaped ducting and diffuser arrangement.

Accordingly, it is an object of the present invention to provide a more axially compact and lighter weight multi-stage rotor for addressing the shortcomings of the known prior art, particularly in its application as a compressor rotor.

SUMMARY OF THE INVENTION

According to the invention there is provided a multi-stage rotor including:
- at least radially innermost, outermost and one or more intermediary concentrically arranged blade sets rotatable about an axis of rotation extending between opposing aft and fore axial ends, wherein each of the blades of the respective blade set are spaced angularly relative to one another and comprise respective innermost, outermost and intermediary radial blade spans as measured between respective diametrically inner and outer ends of such blade;
- at least a radially innermost duct for ducting fluid flow between the innermost blade set and a concentrically adjacent intermediary blade set, the innermost duct defining an innermost duct port and an intermediary duct port being, relative to the axis of rotation, radially displaced one from the other and directed in axially opposing directions; and
- at least a radially outermost duct for ducting fluid flow between the outermost blade set and a concentrically adjacent intermediary blade set, the outermost duct defining an outermost duct port and an intermediary duct port being, relative to the axis of rotation, radially displaced one from the other and directed in axially opposing directions, such that at least the innermost and the outermost ducts co-operatively define an aft-to-fore axially winding and radially directed fluid flow path between the blade sets;
- characterised in that the innermost, outermost and intermediary duct ports comprise radial duct spans, as measured between respective diametrically inner and outer duct walls across such duct port, being greater than the respective innermost, outermost and intermediary radial blade span of the blade set rotatable at least partially within such duct port thereby to define a gap between: (i) the at least one diametrical ends of the radial rotating blades ending radially short of the respective radial duct span to form free ends of the blades; and (ii) a stationary part of the respective duct the free ends of the blades sweep nearest to; for generating a friction wash between such free ends of the blades and the stationary part of the respective duct.

In one embodiment, the multi-stage rotor may be a common shaft-mounted or rim-mounted rotor on which the innermost, outermost and intermediary blade sets are mounted and rotatable, each blade set being connected to the adjacent blade set by one or more spokes.

Furthermore, the common rotor may comprise an innermost ring, an outermost ring, and at least one intermediary ring concentrically mounted relative to one another by the spokes. Generally, the innermost blade set spans substantially between the innermost and adjacent intermediary rings, and are mounted on either one of such rings or the spokes.

Typically, the intermediary blade set spans substantially between the intermediary and adjacent outermost rings, and are mounted on either one of such rings or the spokes. Preferably, the outermost blade set spans substantially radially beyond the outermost ring, and are mounted on either such ring or the spokes extending therefrom. More preferably, the blade sets are configured such that axial blade spans of at least two of the blade sets at least partially overlap one another.

In another embodiment, the multi-stage rotor is made up of one or more independent rotors each having mounted and rotatable thereon any one or more of the innermost, outermost and intermediary blade sets, and further wherein each blade set is connected to its respective independent rotor on an independent hub thereof and/or by one or more spokes.

The independent rotors may be shaft- or rim-mounted, with mountings of each of the independent rotors being spaced axially relative to one another along the axis of rotation, and configured such that an axial blade span of the blade set on one of the independent rotors at least partially overlaps an axial blade span of the blade set on another of the independent rotors.

Typically, the independent rotors are independent innermost, outermost and intermediary rotor annuli one concentrically mounted and rotatable on the another, and further wherein:

each of the rotor annuli comprise diametrically inner and outer rings held apart by the spokes, having the respective blade set mounted therebetween either supported on the inner ring, the outer ring or the spokes;

the inner ring of the concentrically more outer rotor annulus, of adjacent rotor annuli, rides on the outer ring of the concentrically more inner rotor annulus; and either the innermost rotor annulus is shaft-mounted, or the outermost rotor annulus is rim-mounted.

Generally, the inner or the outer ring of the adjacent rotor annuli defines a track formation and the other of the inner or the outer ring of the adjacent rotor annuli comprises a runner formation being correspondingly engageable with the track formation thereby to rotatably locate the outer ring on the inner ring.

Furthermore, the independent rotors may be freely rotatable relative to one another, fixed to rotate together or connected to one another via a transmission to rotate at different speeds.

Generally, the common rotor or the independent rotors include multiple rows of axially spaced auxiliary innermost, outermost and/or intermediary blade sets.

Typically, the radial blade span of the blades, and consequentially the respective radial duct span, from the innermost blade set to the outermost blade set is: (i) the same; or (ii) incrementally greater or smaller. Preferably, the number of blades making up each blade set from the innermost blade set to the outermost blade set is: (i) the same; or (ii) incrementally greater or smaller. More preferably, the blades are configured on the rotor as axial flow and/or radial flow driven blades. Most preferably, leading edges of concentrically adjacent axial flow blades sets are directed in axially opposite directions.

The duct ports of each of the innermost, the intermediary and the outermost ducts may be separated by fluid flow separator formations having an axial dimension greater than the axial blade span of at least one of the blade sets rotatable within one or the other of the duct ports of such duct.

Generally, the fluid flow separator formations are mounted between concentrically adjacent blade sets, on mount arms extending between the duct and the fluid flow separator formations, the fluid flow separator formations being the stationary part of the duct, co-operative with the rotating free ends of the blades, for generating a friction wash therebetween.

Alternatively, the fluid flow separator formations are: (i) the innermost, the outermost and the intermediary rings of the common rotor; or (ii) the inner and the outer rings of the independent rotors; each being rotatable with the respective rotor, and further wherein the ducts or a rotor housing comprise one or more friction plates, being the stationary part of the duct and extending axially into the gap defined radially beyond the free ends of the blades, for generating a friction wash therebetween.

Typically, the multi-stage rotor includes a plurality of guide vanes located along the ducts, and/or axially between the multiple rows of axially spaced innermost, outermost and/or intermediary blade sets, the guide vanes being mounted stationary relative to the rotors and in varying angles relative to the blade sets. In a preferred embodiment, the spokes are shaped as lift generating blades.

Generally, the ducts include a moveable internal wall for altering the volume, pressure and/or velocity of the fluid, the moveable internal wall being controllable by one or more actuators.

The multi-stage rotor may form part of a compressor stage, a turbine stage or both the compressor and the turbine stages of a machine, the multi-stage rotor being housed within a housing defining:

an intake port for directing fluid flow inwardly into: (i) the radially innermost concentric blade set; or (ii) the radially outermost concentric blade set; and an exhaust port for directing fluid flow outwardly from the other of: (i) the radially outermost concentric blade set; or (ii) the radially innermost concentric blade set.

The intake port may be configured to direct fluid flow into the radially innermost or the radially outermost concentric blade sets exclusively, or into such blade sets and into one or more intermediary concentric blade sets simultaneously. Similarly, the exhaust port may be configured to direct fluid flow into the other of the radially outermost or the radially innermost concentric blade sets exclusively, or into such blade sets and into one or more intermediary concentric blade sets simultaneously.

Generally, the multi-stage rotor of the compressor stage of the machine is driven manually, electrically, electromagnetically, by transmission driven, by a turbine and/or by power nozzles on the multi-stage rotor. Typically, the machine is an air-compressor for delivering compressed air to a storage tank or for direct use.

In a preferred embodiment of the air compressor, the air compressor is a supercharger for an engine, wherein the transmission is a chain and sprocket, a belt and pulley or a geared transmission powered by a power output shaft of the engine.

Alternatively, the machine may be a turbocharger for an engine, wherein the multi-stage rotor of the compressor stage thereof is powered by the turbine stage of the turbocharger, the turbine stage of the turbocharger being driven by the exhaust flow of the engine. Preferably, the multi-stage rotor makes up part of the turbine stage of the turbocharger.

Furthermore, the machine may include a combustor having an inlet port, through which compressed air from the exhaust port of the compressor stage is deliverable, and one or more exhaust nozzles through which high velocity exhaust gas is exhaustible from the combustor.

In one embodiment, the exhaust nozzles are mounted on the multi-stage rotor or the combustor, the combustor stationary or rotatable with the multi-stage rotor, such that the thrust from the exhaust nozzles drives rotation thereof.

In an alternative embodiment, the machine is a gas turbine engine further including:

a fan or propeller axially upstream of the compressor stage and located near the intake port thereof; and a turbine stage along the exhaust nozzle and axially downstream of the combustor, the turbine stage being rotatably driven by the high velocity exhaust gas from the combustor for consequential rotary drive of the compressor stage and the fan.

Generally, the multi-stage rotor makes up part of the turbine stage of the gas turbine engine. Typically, the gas turbine engine defines one or more bypass flow ducts for directing fluid from the intake port directly to the combustor, the turbine stage or into the exhaust nozzle downstream of the turbine stage.

According to a second aspect of the invention, there is provided an air compressor including:
- a compressor stage comprising the multi-stage rotor of anyone of claims 1 to 17 rotatably housed within a compressor housing, the compressor housing defining:
  - an intake port for directing fluid flow inwardly into: (i) the radially innermost concentric blade set; or (ii) the radially outermost concentric blade set; of the multi-stage rotor; and
  - an exhaust port for directing fluid flow outwardly from the other of: (i) the radially outermost concentric blade set; or (ii) the radially innermost concentric blade set; of the multi-stage rotor; and
- a drive input formation for inputting electrical or mechanical rotary drive to the multi-stage rotor of the compressor stage for compressing air passing through the compressor stage.

According to a third aspect of the invention, there is provided a turbocharger including:
- a compressor stage comprising the multi-stage rotor of anyone of claims 1 to 17 rotatably housed within a compressor housing, the compressor housing defining:
  - an intake port for directing fluid flow inwardly into: (i) the radially innermost concentric blade set; or (ii) the radially outermost concentric blade set; of the multi-stage rotor; and
  - an exhaust port for directing fluid flow outwardly from the other of: (i) the radially outermost concentric blade set; or (ii) the radially innermost concentric blade set; of the multi-stage rotor;
- a turbine stage comprising a turbine rotor, in the form of the multi-stage rotor of anyone of claims 1 to 17 or an alternatively configured turbine rotor, rotatably housed within a turbine housing, the turbine housing defining intake and exhaust ports through which exhaust flow from an engine is deliverable for rotatably driving the turbine rotor; and
- a shaft connected between the turbine rotor and the multi-stage rotor of the compressor stage thereby to transmit rotary drive therebetween for compressing air passing through the compressor stage.

According to a fourth aspect of the invention, there is provided a gas turbine engine including:
- a compressor stage comprising the multi-stage rotor of anyone of claims 1 to 17 rotatably housed within a compressor housing or engine casing defining:
  - an intake port for directing fluid flow inwardly into: (i) the radially innermost concentric blade set; or (ii) the radially outermost concentric blade set; of the multi-stage rotor; and
  - an exhaust port for directing fluid flow outwardly from the other of: (i) the radially outermost concentric blade set; or (ii) the radially innermost concentric blade set; of the multi-stage rotor;
- a combustor having an inlet port, through which compressed air from the exhaust port of the compressor stage is deliverable, and one or more exhaust nozzles through which high velocity exhaust gas is exhaustible from the combustor;
- a turbine stage, located in a turbine housing or in the engine casing downstream of the combustor along the exhaust nozzle, comprising a turbine rotor in the form of the multi-stage rotor of anyone of claims 1 to 17 or an alternatively configured turbine rotor, the turbine stage being rotatably driven by the high velocity exhaust gas exhaustible from the combustor, for consequential rotary drive of the compressor stage.

The gas turbine engine preferably further includes one or more of the following:
- a fan or propeller axially upstream of the compressor stage and located near the intake port thereof, wherein the fan or the propeller are rotatably driven by the turbine stage;
- one or more bypass flow ducts, defined by the engine casing, for directing fluid from the intake port directly to the combustor, the turbine stage or into the exhaust nozzle downstream of the turbine stage; and
- bleed valves along the compressor stage to bleed medium to high compressed fluid to be directed from the compressor for driving auxiliary devices.

BRIEF DESCRIPTION OF THE INVENTION

The invention will now be described in more detail, by way of example only, with reference to the accompanying illustrations, in which.

DETAILED DESCRIPTION OF THE INVENTION

Figure 1:
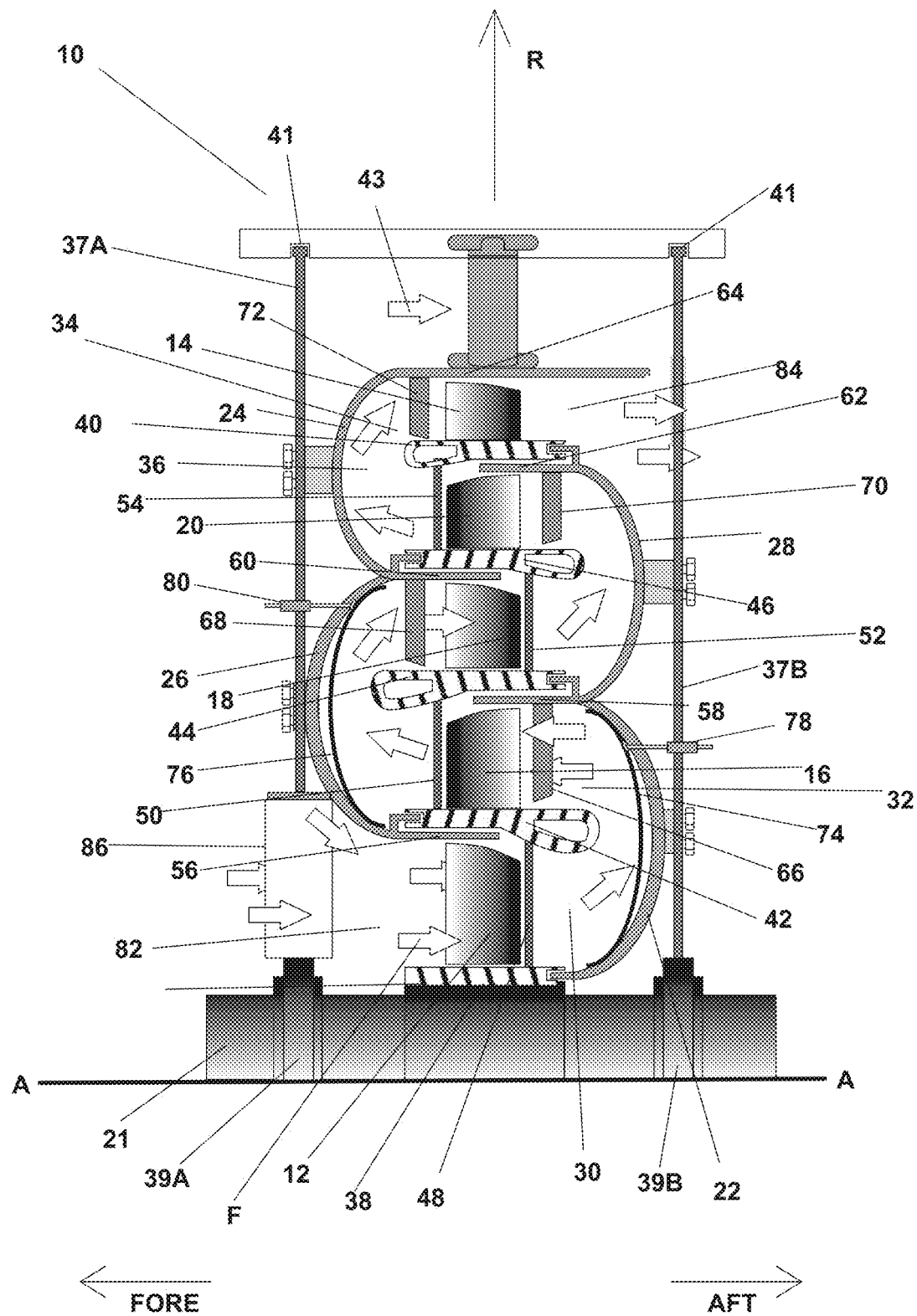
FIG. 1 is a half cross-section side view of a multi-stage rotor in accordance with the present invention.
Figure 2:
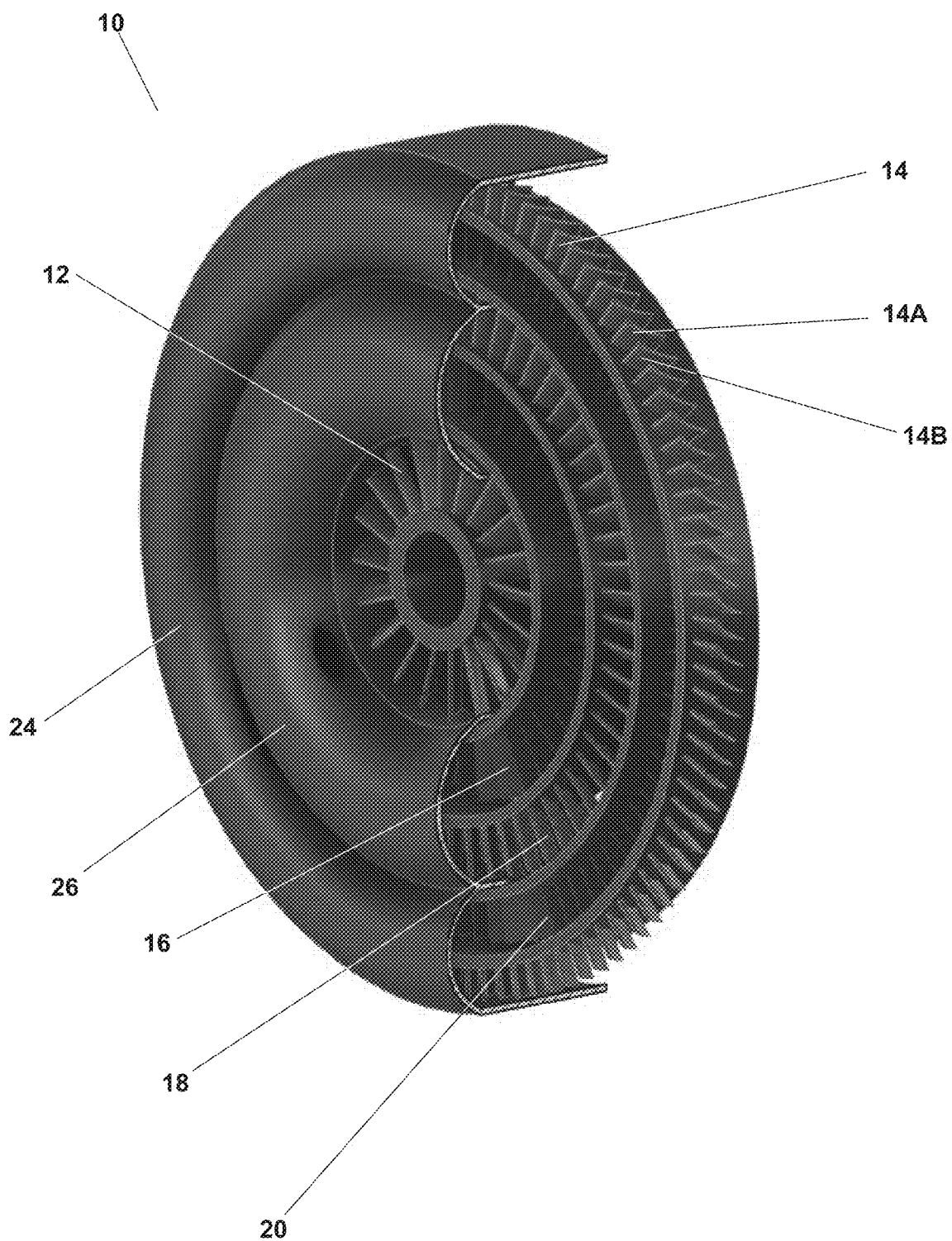
FIG. 2 is a partially cross-sectioned perspective view of the multi-stage rotor of FIG. 1.

A multi-stage rotor according to an embodiment of the invention is designated generally in FIG. 1 and FIG. 2 by reference numeral 10. The multi-stage rotor 10 includes a radially innermost blade set 12, a concentric radially outermost blade set 14, and respective primary, secondary and tertiary concentric intermediary blade sets 16, 18, 20. It will be appreciated that although the illustrated embodiment of the invention shows three intermediary blade sets, it will be appreciated that invention is workable with at least one intermediary blade set.

The blade sets 12, 14, 16, 18, 20 are shaft-mounted on shaft 21 and rotatable about an axis of rotation A-A. Although the multi-stage rotor 10 has been illustrated as shaft-mounted in FIG. 1, it will be appreciated that the multi-stage rotor 10 could be configured as a shaftless, rim-mounted multi-stage rotor 10.

With reference now also to FIG. 2, the individual blades 14A, 14B of the outermost blade set 14 are spaced angularly relative to one another about the axis of rotation A-A. It will be appreciated that the individual blades of each of the blade sets 12, 14, 16, 18, 20 are angularly spaced with respect to one another in the same manner.

Figure 3:
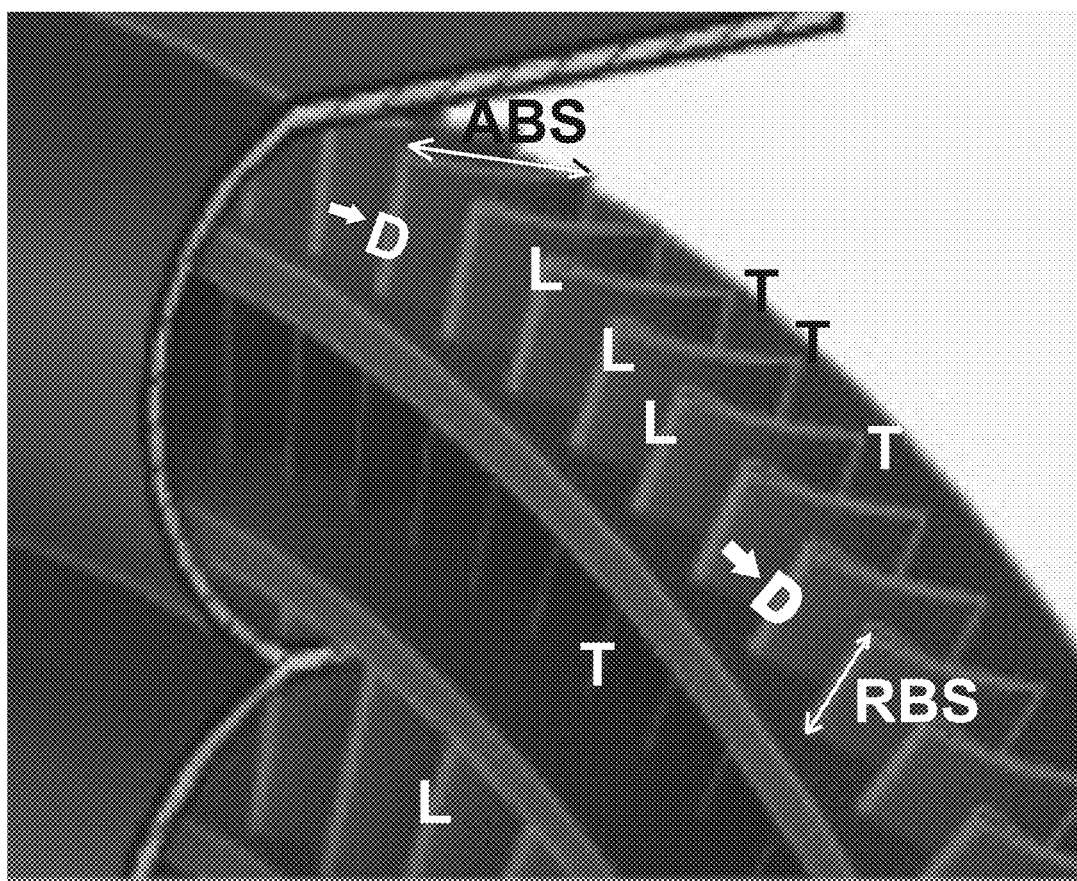
FIG. 3 is a zoomed in perspective view of certain of the blades of the multi-stage rotor of FIG. 1.

With reference to FIG. 3, the individual blades are axial flow type, each having opposing leading and trailing edges "L", "T" spaced from one another axially with respect to the axis of rotation A-A across an axial blade span "ABS" thereof. The axial blade span "ABS" is obliquely angled relative to the direction of fluid flow, as depicted by arrows "F", thereby to generate a drive force "D" for rotating the blade sets 12, 14, 16, 18, 20 about the axis of rotation A-A.

The axial flow type blades may be paddle-like blades driven by fluid flow impinging on the angled face thereof facing the fluid flow. Alternatively, or in combination with such paddle-like blades, the axial flow type blades may be aerofoil-shaped blades with the drive force "D" being in the form of a lift force produced by each aerofoil-shaped blades.

The individual blades each also comprise respective innermost, outermost and intermediary radial blade spans "RBS", as measured between respective diametrically mounted inner ends and free outer ends of such blade.

Furthermore, the multi-stage rotor 10 includes: a radially innermost duct 22 for ducting fluid flow between the innermost blade set 12 and the concentrically adjacent primary intermediary blade set 16; a radially outermost duct 24 for ducting fluid flow between the outermost blade set 14 and the concentrically adjacent tertiary blade set 20; and intermediary ducts 26, 28 for ducting fluid flow between the respective primary, secondary and tertiary intermediary blade sets 16, 18, 20.

The innermost duct 22 defines a radially innermost duct port 30 and an intermediary duct port 32 being, relative to the axis of rotation A-A, radially displaced one from the other and directed in axially opposing directions.

Similarly, the outermost duct 24 defines an outermost duct port 34 and an intermediary duct port 36 being, relative to the axis of rotation, radially displaced one from the other and directed in axially opposing directions.

It will be appreciated then that each of the innermost and outermost ducts 22, 24, as well as the intermediary ducts 26, 28, each comprises respective radially more inner and radially more outer duct ports directed in axially opposing directions. In this manner, and as depicted by fluid flow arrows "F", the net effect is for the ducts to co-operatively define a winding, radially inwards-to-outwards fluid flow path between the blade sets 12, 14, 16, 18, 20.

More specifically, the winding fluid flow path is an aft-to-fore reversing flow path such that each duct 22, 24, 26, 28 axially reverses the fluid flow direction exhausting from the duct relative to the axial direction in which it entered such duct. To this end, and to ensure that the fluid flow impinges the blades correctly, the axial direction in which the leading edges "L" of concentrically adjacent blade sets face alternate (i.e. the leading edges of the innermost blade set 12, the secondary intermediary blade set 18 and the outermost blade set 14 face the fore direction, with the leading edges of the primary and tertiary intermediary blade sets 16, 20 facing the aft direction.

It will be appreciated that the ducts 22, 24, 26, 28 are separate ducts, or that the ducts at least on the same aft or fore sides of the multi-stage rotor 10 are connected or integral with one another, and mounted in position on respective fore and aft duct mountings 37A, 37B.

The duct mountings 37A, 37B are supported at one end on the shaft on bearings 39A, 39B, and mounted on an opposite end on its own casing 41, or the casing/housing of a machine to which the multi-stage rotor 10 is integral with or connected to, thereby to define a bypass flow duct 43.

In the embodiment depicted in FIG. 1 and FIG. 2, the multi-stage rotor 10 comprises an innermost ring 38, an outermost ring 40, and primary, secondary and tertiary intermediary rings 42, 44, 46 concentrically mounted relative to one another by respective spokes 48, 50, 52, 54 spanning therebetween, such that the rings 38, 40, 42, 44, 46 and consequentially the blade sets 12, 14, 16, 18, 20 mounted therebetween, rotate together in the same direction about the axis of rotation A-A.

In this embodiment of the multi-stage rotor 10, the rings 38, 40, 42, 44, 46 act as fluid flow separator formations, doubling up as part of the ducts 22, 24, 26, 28. The blades of the radially innermost blade set 12 have their diametrically inner ends mounted on the innermost ring 38 and their diametrically free outer ends terminating radially short of the primary intermediary ring 42, i.e. the radial blade span "RBS" of at least the trailing edge of the innermost blade set 12 is radially smaller than a radial duct span "RDS" of the innermost duct port 30 as measured between respective diametrically inner and outer duct walls thereof, being concentric fluid flow separator formations 38, 42.

It will be appreciated that of the blades of the remaining concentric blade sets 14, 16, 18, 20 have their diametrically inner ends mounted on a concentrically more inner ring with their free outer ends terminating short of the diametrically outer duct wall of the respective duct port, so as to define a gap between such outer duct wall and the free outer ends of each blade set 12, 14, 16, 18, 20.

In the illustrated embodiment of the multi-stage rotor 10 of FIG. 1 and FIG. 2, a stationary part of the respective duct, in the form of friction plates 56, 58, 60, 62, 64, protrude axially into the gaps beyond the leading edges of the blades. Operatively, and with the rotating free ends of the blades rotatably sweeping in close proximity across the stationary friction plates, a friction wash between the free ends of the blades and the friction plates is generated, which friction wash, particularly in the application of a compressor, increases air friction with the resultant effect of reducing air velocity thereby to increase pressure and consequentially increase the efficiency of such compressor.

The multi-stage rotor 10 further includes a plurality of guide vanes 66, 68, 70, 72 fixedly located along the fluid path defined by the ducts 22, 24, 26, 28. It will be appreciated that the guide vanes 66, 68, 70, 72 are angled relative to and located axially upstream (relative to the direction of fluid flow "F") of the respective primary intermediary blade set 16, secondary intermediary blade set 18, tertiary intermediary blade set 20 and the outermost blade set 14 such that each axially adjacent guide vane-blade set pairing form a stage of compression in the application of compressors.

In a preferred embodiment, one or more of the ducts include a moveable internal wall 74, 76 for altering the volume, pressure and/or velocity of the fluid. The moveable internal walls 74, 76 are preferably moveable to increase or decrease the duct volume axially by respective actuators 78, 80.

The multi-stage rotor 10 further includes an intake port 82 for directing fluid flow axially inwardly into the innermost blade set 12, and an exhaust port 84 for directing fluid flow axially outwardly from the outermost blade set 14. Positioned axially upstream of the innermost blade set 12 are inlet guide vanes 86, which together make up the first stage of the 5-stage compressor.

In this configuration, with the fluid flow being directed from a radially more inner position and exhausted from a radially more outward position, it is preferable that the radial blade span "RBS" of each blade set, and consequentially the radial duct span "RDS" associated with such blade set, incrementally decreases from the innermost towards the outermost blade sets 12, 14. Configured in this manner, it is also preferable that the number of blades making up each blade set incrementally increases from the innermost towards the outermost blade sets 12, 14.

It will be appreciated that where the fluid flow is instead directed from a radially more outer position and exhausted from a radially more inward position, it is preferable that the radial blade span "RBS" of each blade set, and consequentially the radial duct span "RDS" associated with such blade set, incrementally decreases from the outermost towards the innermost blade sets 14, 12.

Figure 4:
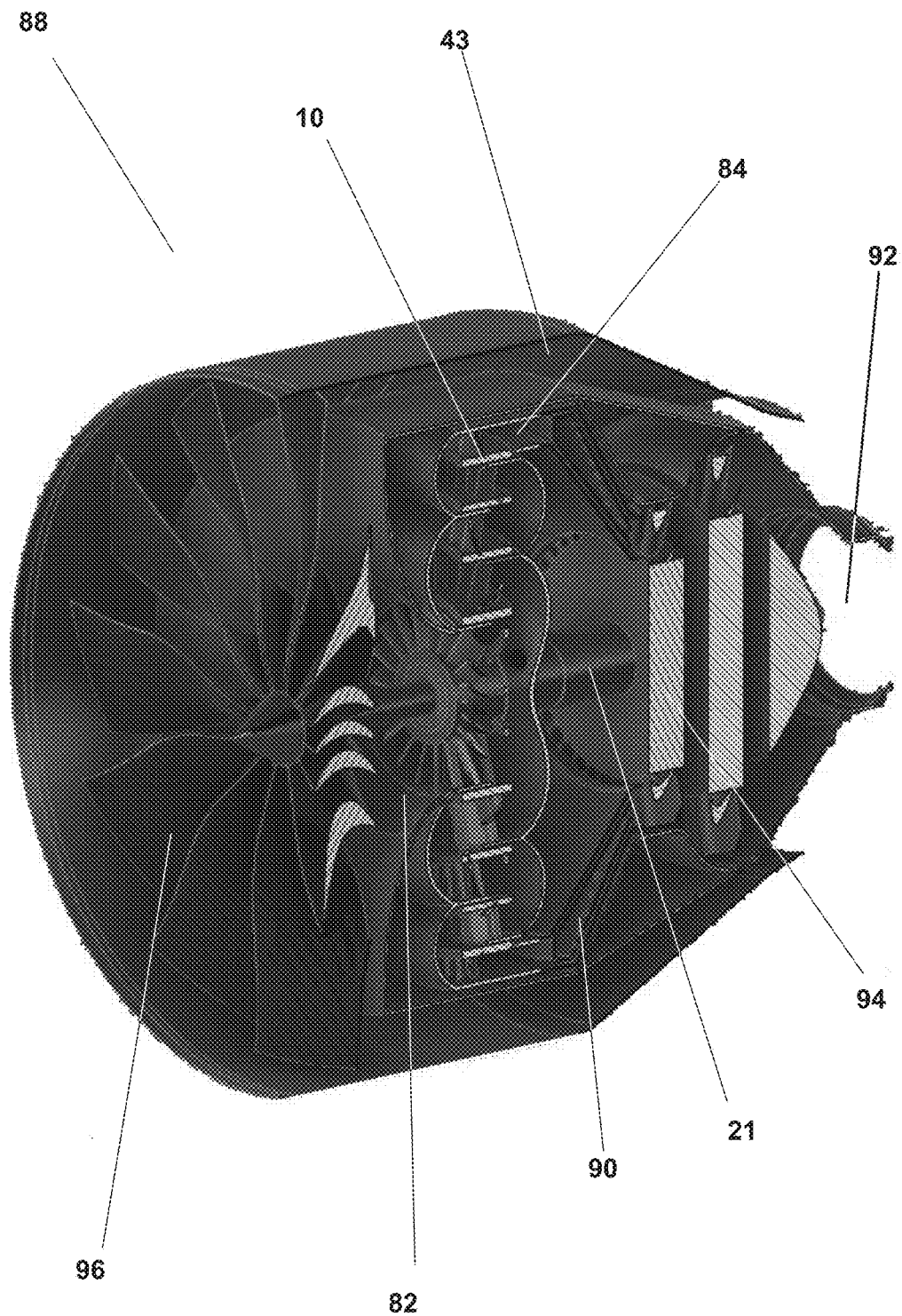
FIG. 4 is a half cross-section perspective view of a gas turbine engine incorporating the multi-stage rotor of FIG. 1.

With reference now to FIG. 4, and in an application to which the multi-stage rotor 10 is particularly suited, the multi-stage rotor 10 forms the compressor stage of a gas turbine engine 88, whereby compressed air having passed through 5 stages of compression exhausts via the exhaust port 84 of the multi-stage rotor 10 into a combustor 90.

High velocity exhaust gas is exhaustible from the combustor 90 towards an exhaust nozzle 92 via a turbine stage 94, which is rotatably driven by the high velocity exhaust gas passing over blades thereof. The turbine stage 94, having a multi-stage rotor 10 of the present invention or an alternative turbine rotor, rotatably drives the shaft 21 and consequentially the shaft-mounted multi-stage rotor 10 and a shaft-mounted fan or propeller 96 axially upstream of the multi-stage rotor 10, ahead of the intake port 82 thereinto.

In use, fluid in the form of air is guided by the stationary inlet guide vanes 86 at the required angle via the intake port 82 into the multi-stage rotor compressor stage 10 of the gas-turbine engine 88.

The innermost blades set 12 imparts energy to the incoming air, forcing the air rearwards in the aft direction, gaining further pressure as it brushes against the stationary friction plate 56. The energised air flows past a plurality of spokes 48 and into the innermost duct 22, reversing the axially aft directed airflow into an axially fore directed airflow towards the primary intermediary blade set 16.

The increased velocity air is slowed down as it impacts the inner walls of the duct 22, building up pressure, and an increasing velocity and compression as it is forced through the reducing volume of the duct 22 between duct ports 30, 32. The air flow can be altered by the actuated moveable internal wall 74 of the duct 22.

As the compressed air enters the relatively smaller annular opening of the primary intermediary blade set 16, in an aft to fore axial direction, the air is first redirected to the desired angle by guide vane 66 before making contact with the leading edges of the blades of the primary intermediary blade set 16, which leading edges face an axial aft opposite direction as compared to the axial fore direction the leading edges of the innermost blades set 12 face.

The air is further energised by the primary intermediary blade set 16, with further compression gained as the air moves relative to the stationary friction plate 58. The stationary friction plate 58 protruding circumferentially into the gap defined between the free ends of the primary intermediary blade set 16 and the secondary intermediary ring 44. The air flows around the next set of spokes 50 before entering intermediary duct 26, which again reverses the airflow, this time from an axially fore direction into an axially aft direction.

The process is continued throughout all the succeeding stages, with incrementally reducing volume flow area, guide vane size and radial blade spans, and incrementally increasing number of blades per blade set. The pressure is incrementally increased from stage 1 to stage 5, where after the compressed air exhausts from the multi-stage rotor 10 via the exhaust port 84, into the combustor 90, the subsequent operation thereof and the turbine stage 94 having been explained in detail above.

Figure 5:
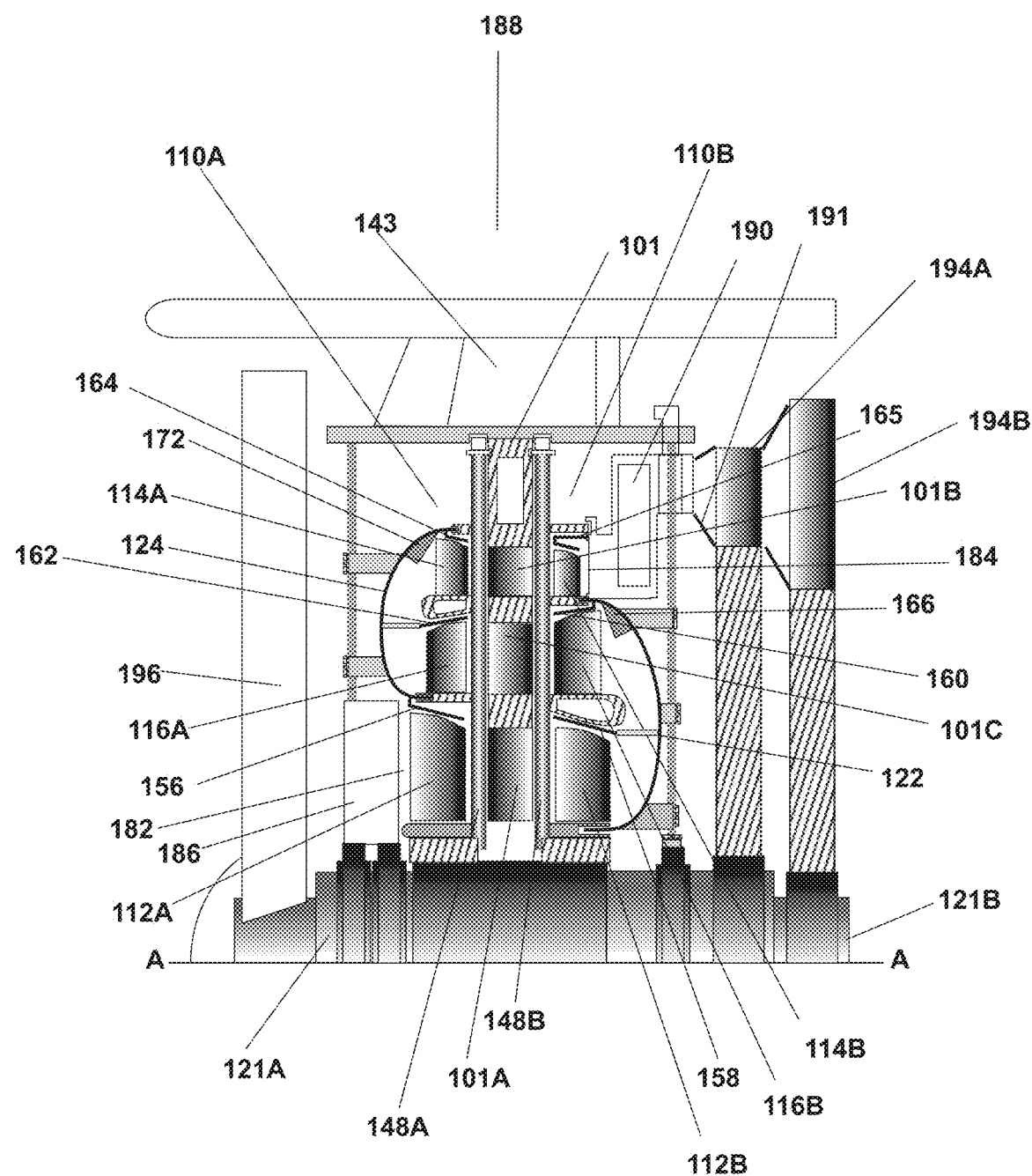
FIG. 5 is a half cross-sectioned side view of a gas turbine engine incorporating a multi-stage rotor in accordance with a second embodiment of the invention.

FIG. 5 illustrates an alternative embodiment of a gas turbine engine 188, with like references designating like parts, incorporating two multi-stage rotors 110A, 110B mounted axially spaced from one another along a shaft 121, with a stator 101 sandwiched therebetween, wherein the shaft is rotatable about an axis of rotation A-A. It will be appreciated that the two multi-stage rotors 110A, 110B may be mounted on the same hub and construed as a result as a single dual-rotor with an axial spacing for accommodating the stator 101.

The fore multi-stage rotor 110A includes a radially innermost blade set 112A, a radially outermost blade set 114A and a single intermediary blade sets 116A supported concentrically relative to one another by a plurality of radially extending fore spokes 148A. Similarly, the aft multi-stage rotor 110B includes a radially innermost blade set 112B, a radially outermost blade set 114B and a single intermediary blade sets 116B supported concentrically relative to one another by a plurality of radially extending aft spokes 148B.

It will be appreciated that otherwise than specifically described to the contrary, the setup (i.e. axial blade spans, incrementally decreasing radial blade spans, incrementally increasing number of blades per blade set, angular spacing of blades per blade set, alternating leading edge direction, blade type, blade supporting rings doubling up as fluid flow separator formations, shaft-mounting, bearings, etc.) of each of the split multi-stage rotor 110A, 110B is much the same as that of the multi-stage rotor 10 and gas turbine engine 88 illustrated in FIGS. 1 to 4.

The gas turbine engine 188 includes a radially innermost duct 122 for ducting fluid flow between the innermost blade set 112B of the aft multi-stage rotor 110B and the concentrically adjacent intermediary blade set 116B thereof. Furthermore, the gas turbine engine 188 includes a radially outermost duct 124 for ducting fluid flow between the intermediary blade set 116A of the fore multi-stage rotor 110A and the concentrically adjacent outermost blade set 114A thereof.

It will be appreciated that otherwise than specifically described to the contrary, the setup (i.e. duct port configuration, radial duct span, duct mountings, etc.) of each of the ducts 122, 124 is much the same as that of the multi-stage rotor 110 and gas turbine engine 88 illustrated in FIGS. 1 to 4. In this manner, the net effect is for the ducts 122, 124 to co-operatively define a winding, radially inwards-to-outwards fluid flow path between the blade sets, with guide vanes 166, 172 located therealong.

The stator 101 comprises concentric innermost, outermost and intermediary stationary stator vanes 101A, 101B, 101C, with: the innermost stator vanes 101A located concentrically aligned with and between the radially innermost blade sets 112A, 112B; the outermost stator vanes 101B located concentrically aligned with and between the radially outermost blade sets 114A, 114B; and the intermediary stator vanes 101C located concentrically aligned with and between the intermediary blade sets 116A, 116B.

In use, fluid in the form of air is guided by stationary inlet guide vanes 186 at the required angle via an intake port 182 into the fore multi-stage rotor 110A compressor stage of the gas-turbine engine 188.

The radially innermost blade set 112A of the fore multi-stage rotor 110A imparts energy to the incoming air, forcing the air rearwards in the aft direction, gaining further pressure caused by a friction wash generated between a stationary friction plate 156, extending from the fore duct 124 into a gap defined radially beyond free ends of the radially innermost blade set 112A, and such free ends of the radially innermost blade set 112A.

The energised airflow passes through the spokes 148A and over stator vane 101A, which reduces the velocity of the airflow, increases the pressure thereof and guides the airflow to engage the leading edge of the radially innermost blade set 112B of the aft multi-stage rotor 110B.

The rotating innermost blade set 112B of the aft multi-stage rotor 110B further energises the compressed air, forcing it to move rearward in the aft direction, gaining pressure caused by a further friction wash generated between a stationary friction plate 158, extending from the aft duct 122 into a gap defined radially beyond free ends of the radially innermost blade set 112B, and such free ends of the radially innermost blade set 112B.

It will be appreciated that the above operational description of the dual multi-stage rotor 110A, 110B provides the first two stages of a six stage compressor stage. It will be appreciated that similar pressure increasing friction washes are caused by the additional friction plates 160, 162, 164, 165 and the free ends of the respective blade sets 116B, 116A, 114A, 114B.

The airflow then moves into and through the aft duct 122, which duct reverses the axially aft directed airflow into an axially fore directed airflow towards the intermediary blade set 116B.

The increased velocity air is slowed down as it impacts the inner walls of the duct 122, building up pressure, and an increasing velocity and compression as it is forced through the reducing volume of the duct 122 between opposing duct ports thereof. A stationary guide vane is 166 is located along the duct 122, which guides the airflow towards the leading edge of the intermediary blade set 116B of the aft multi-stage rotor 110B.

The airflow traverses the remaining stages in the same repetitive manner, incrementally increasing the pressure of the air through the subsequent four stages until it reaches the annular exhaust port 184 downstream of the outermost blade set 114B of the aft multi-stage rotor 110B, after having travelled through: both intermediary blade sets 116A, 116B and the stator vanes 101C sandwiched therebetween; the fore duct 124 and the stationary guide vane 172 located therealong; and both outermost blade sets 114A, 114B.

Following compression by the 6 stage compressor stage multi-stage rotor 110A, 110B, the airflow exhausts via the exhaust port 184 into a combustor 190, with high velocity exhaust gas exhaustible from the combustor 190 and directed towards a two stage turbine 194A, 194B via a combustor exhaust 191.

The two stage turbine is made up of a high-pressure turbine 194A and a low-pressure turbine 194B. The high-pressure turbine 194A drives rotation of the high-pressure shaft 121A, consequentially driving rotation of the multi-stage rotor 110A, 110B. Similarly, the low-pressure turbine 194B drives rotation of the low-pressure shaft 121B, consequentially driving rotation of the fan or propeller 196 for directing airflow into the intake port 182 and/or through the bypass 143.

Figure 6:
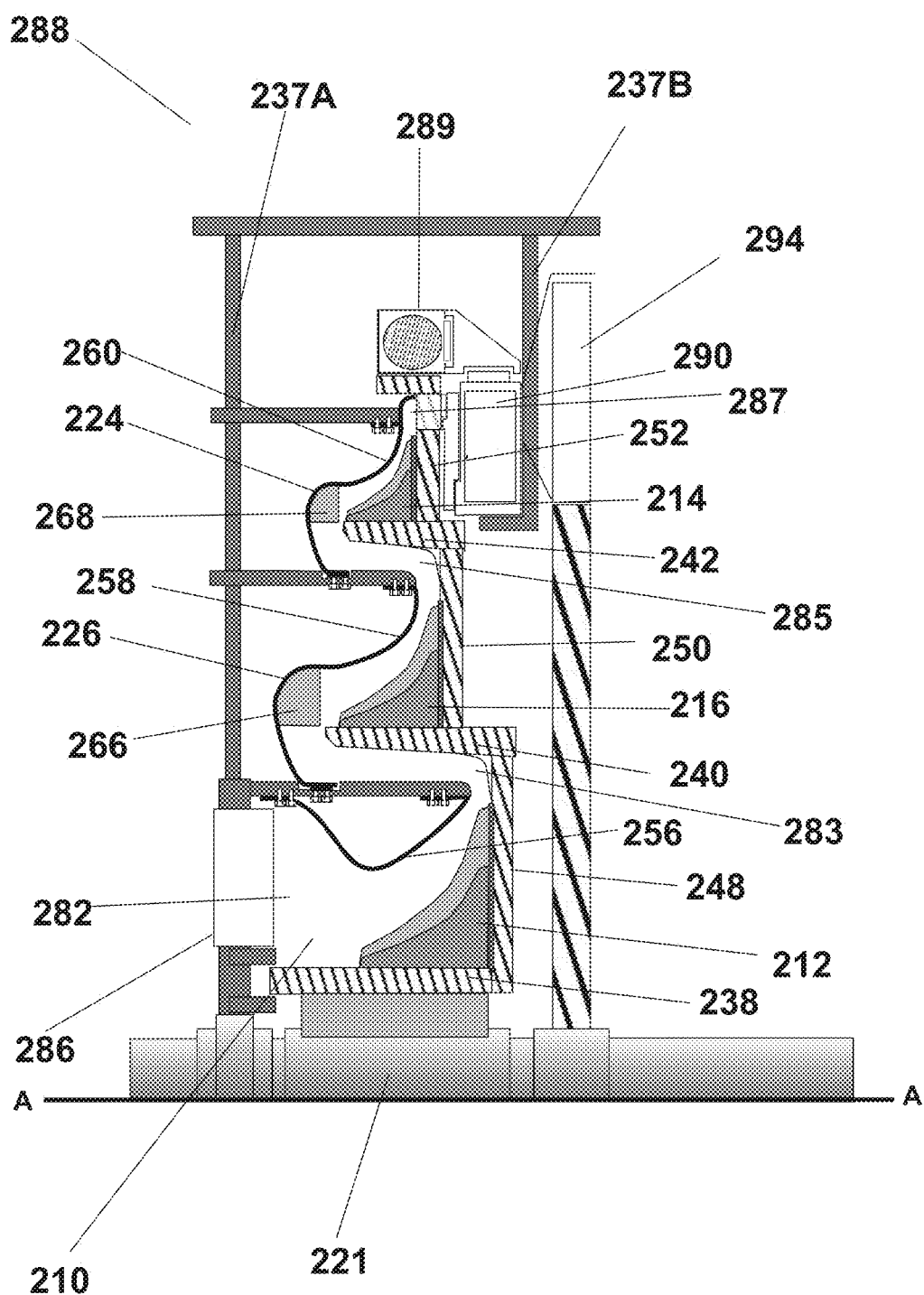
FIG. 6 is a half cross-sectioned side view of a gas turbine engine incorporating a multi-stage rotor in accordance with a third embodiment of the invention.

FIG. 6 illustrates yet a further alternative embodiment of a gas turbine engine 288, with like references designating like parts, incorporating a multi-stage rotor 210 mounted on a shaft 221 being rotatable about an axis of rotation A-A.

The multi-stage rotor 210 includes concentric ring mounted 238, 240, 242 radially innermost, outermost and intermediary blade sets 212, 214, 216, concentrically mounted relative to one another by a plurality of radially extending spokes 248, 250, 252 extending between such rings 238, 240, 242. It will be appreciated that the multi-stage rotor 210 of this third embodiment of the invention, instead of axial flow type blades, incorporates radial flow type blades.

It will be appreciated that otherwise than specifically described to the contrary, the setup (i.e. axial blade spans, incrementally decreasing radial blade spans, incrementally increasing number of blades per blade set, angular spacing of blades per blade set, blade supporting rings doubling up as fluid flow separator formations, shaft-mounting, bearings, etc.) of the multi-stage rotor 210 is much the same as that of the multi-stage rotor 10 and gas turbine engine 88 illustrated in FIGS. 1 to 4.

In use, air flows over an inlet guide 286 and into the intake port 282 to impinge the leading edges of the radially innermost blade set 212. A stationary friction plate 256 is disposed along the intake port 282, acting as an innermost duct. Much the same as in the previous embodiments of the invention, a friction wash between the friction plate 256 and free ends of the radially innermost blade set 212 is generated, which friction wash increases air friction with the resultant effect of reducing air velocity thereby to increase pressure prior to directing the compressed air from the first stage to the second stage via a first diffuser 283.

The airflow traverses the remaining stages in the same repetitive manner, incrementally increasing the pressure of the air through the subsequent two stages, passing: through the intermediary and outermost ducts 226, 224; over guide vanes 266, 268 and further friction plates 258, 260 disposed along the respective intermediary and outermost ducts 226, 224; through further diffusers 285, 287; and ultimately to exhaust through circumferentially directed nozzles 289, which drives rotation of the multi-stage rotor 210 and the shaft 221.

The gas turbine engine 288 further includes friction plate and duct mountings 237A, and a further mounting 237B for mounting the combustor 290, through which the airflow passes prior to exhausting through the nozzles 289. Alternatively, or in addition thereto, the combustor 290 may exhaust to a turbine 294.

Although the ducts again co-operatively define a winding, radially inwards-to-outwards fluid flow path between the blade sets 212, 214, 216, it will be appreciated this in this embodiment, the leading edges of the blades all face one and the same fore axial direction.

By configuring the compression or turbine stages concentrically radially relative to one another, instead of axially as is the case with most existing compressor and turbine technology, the compressor and/or turbine stages (as well as the machine incorporating the multi-stage rotor technology as a whole) is more axially compact and lighter in weight.

Although the invention has been described with reference to a preferred embodiment, it will be appreciated that many modifications or variations of the invention are possible without departing from the spirit or scope of the invention.

For example, instead of the spokes physically connecting the innermost, outermost and intermediary blade sets to rotate in unison, one or more of each blade set could be part of independent innermost, outermost and intermediary rotors or rotor annuli one concentrically mounted relative to the other.

Another example is the configuration of the ducts. Although illustrated primarily as being half toroidal in shape, the ducts may be configured differently. For instance, in the form of piping passing between the various blade sets.

Figure 7:
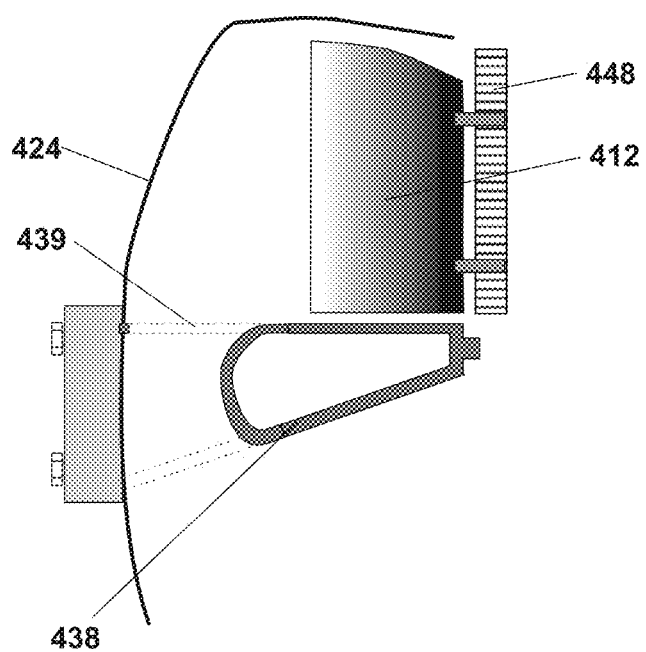
FIG. 7 is a partial cross-sectioned side view of a multi-stage rotor in accordance with a fourth embodiment of the invention.

Furthermore, instead of the fluid flow separator formations 438 being the rings on which the blades are mounted, the blade sets 412 can be mounted on spokes 448, with the fluid flow separator formations 438 fixedly mounted relative to the blade sets on mounting arms 439 extending from the duct 424 as depicted in FIG. 7. In the manner, the fluid flow separator formations 438 are stationary and double up as the friction plates.

Although the machine depicted in the accompanying Figures is a gas turbine engine to which the multi-stage rotor is applied, it will be appreciated that the multi-stage rotor may be applied to other machines such as air-compressors, supercharges, turbocharges and wind-turbines.

The invention claimed is:

1. A multi-stage rotor including:
at least radially innermost, outermost and one or more intermediary concentrically arranged blade sets rotatable about an axis of rotation extending between opposing aft and fore axial ends, wherein each of the blades of the respective blade set are spaced angularly relative to one another and comprise respective innermost, outermost and intermediary radial blade spans as measured between respective diametrically inner and outer ends of such blade;
at least a radially innermost duct for ducting fluid flow between the innermost blade set and a concentrically adjacent intermediary blade set, the innermost duct defining an innermost duct port and an intermediary duct port being, relative to the axis of rotation, radially displaced one from the other and directed in axially opposing directions; and
at least a radially outermost duct for ducting fluid flow between the outermost blade set and a concentrically adjacent intermediary blade set, the outermost duct defining an outermost duct port and an intermediary duct port being, relative to the axis of rotation, radially displaced one from the other and directed in axially opposing directions, such that at least the innermost and the outermost ducts co-operatively define an aft-to-fore axially winding and radially directed fluid flow path between the blade sets;
characterised in that the innermost, outermost and intermediary duct ports comprise radial duct spans, as measured between respective diametrically inner and outer duct walls across such duct port, being greater than the respective innermost, outermost and intermediary radial blade span of the blade set rotatable at least partially within such duct port thereby to define a gap between: (i) the at least one radially outer ends of the radial rotating blades ending radially short of the respective radial duct span to form free ends of the blades; and (ii) a stationary part of the respective duct the free ends of the blades sweep nearest to; for generating a friction wash between such free ends of the blades and the stationary part of the respective duct.

2. The multi-stage rotor according to claim 1, wherein:
the multi-stage rotor is a common shaft-mounted or rim-mounted rotor on which the innermost, outermost and intermediary blade sets are mounted and rotatable, each blade set being connected to the adjacent blade set by one or more spokes; or
made up of one or more independent rotors each having mounted and rotatable thereon any one or more of the innermost, outermost and intermediary blade sets, and further wherein each blade set is connected to its respective independent rotor by one or more of an independent hub thereof and by one or more spokes.

3. The multi-stage rotor according to claim 2, wherein the common rotor comprises an innermost ring, an outermost ring, and at least one intermediary ring concentrically mounted relative to one another by the spokes, and further wherein:
the innermost blade set substantially spanning between the innermost and adjacent intermediary rings, and mounted on either one of such rings or the spokes;
the intermediary blade set substantially spanning between the intermediary and adjacent outermost rings, and mounted on either one of such rings or the spokes;
the outermost blade set substantially spanning radially beyond the outermost ring, and mounted on either such ring or the spokes extending therefrom;
the blade sets are configured such that axial blade spans of at least two of the blade sets at least partially overlap one another; and
the common rotor includes multiple rows of axially spaced auxiliary subsets, including one or more of innermost, outermost and intermediary blade sets.

4. The multi-stage rotor according to claim 2, wherein the independent rotors are shaft-or rim-mounted, with mountings of each of the independent rotors being spaced axially relative to one another along the axis of rotation, and configured such that an axial blade span of the blade set on one of the independent rotors at least partially overlaps an axial blade span of the blade set on another of the independent rotors.

5. The multi-stage rotor according to claim 2, wherein the independent rotors are independent innermost, outermost and intermediary rotor annuli one concentrically mounted and rotatable on the another, and further wherein:
each of the rotor annuli comprise diametrically inner and outer rings held apart by the spokes, having the respective blade set mounted therebetween either supported on the inner ring, the outer ring or the spokes;
the inner ring of the concentrically more outer rotor annulus, of adjacent rotor annuli, rides on the outer ring of the concentrically more inner rotor annulus; and
either the innermost rotor annulus is shaft-mounted, or the outermost rotor annulus is rim-mounted.

6. The multi-stage rotor according to claim 5, wherein the inner or the outer ring of the adjacent rotor annuli defines a track formation and the other of the inner or the outer ring of the adjacent rotor annuli comprises a runner formation being correspondingly engageable with the track formation thereby to rotatably locate the outer ring on the inner ring.

7. The multi-stage rotor according to claim 6, wherein the independent rotors are freely rotatable relative to one another, fixed to rotate together or connected to one another via a transmission to rotate at different speeds, and further wherein the independent rotors include multiple rows of axially spaced auxiliary blade sets, including one or more of innermost, outermost and intermediary blade sets.

8. The multi-stage rotor according to claim 3, wherein:
the radial blade span of the blades, and consequentially the respective radial duct span, from the innermost blade set to the outermost blade set is: (i) the same; or (ii) incrementally greater or smaller;
the number of blades making up each blade set from the innermost blade set to the outermost blade set is: (i) the same; or (ii) incrementally greater or smaller;
the blades are configured on the rotor as one or more of axial flow ands radial flow driven blades; and
leading edges of concentrically adjacent axial flow blades sets are directed in axially opposite directions.

9. The multi-stage rotor according to claim 3, wherein the duct ports of each of the innermost, the intermediary and the outermost ducts are separated by fluid flow separator formations having an axial dimension greater than the axial blade span of at least one of the blade sets rotatable within one or the other of the duct ports of such duct.

10. The multi-stage rotor according to claim 9, wherein the fluid flow separator formations are:
mounted between concentrically adjacent blade sets, on mount arms extending between the duct and the fluid flow separator formations, the fluid flow separator formations being the stationary part of the duct, co-operative with the rotating free ends of the blades, for generating a friction wash therebetween; or
(i) the innermost, the outermost and the intermediary rings of the common rotor; or (ii) the inner and the outer rings of the independent rotors; each being rotatable with the respective rotor, and further wherein the ducts or a rotor housing comprise one or more friction plates, being the stationary part of the duct and extending axially into the gap defined radially beyond the free ends of the blades, for generating a friction wash therebetween.

11. The multi-stage rotor according to claim 1, wherein the multi-stage rotor forms part of a compressor stage, a turbine stage or both the compressor and the turbine stages of a machine, the multi-stage rotor being housed within a housing defining:
an intake port for directing fluid flow inwardly into: (i) the radially innermost blade set; (ii) the radially outermost blade set; or (iii) one or more if the radially innermost and the radially outermost blade sets, and one or more of the intermediary blade sets simultaneously; and
an exhaust port for directing fluid flow outwardly from the other of: (i) the radially outermost blade set; (ii) the radially innermost blade set; or (iii) one or more of the radially outermost and the radially innermost blade sets, and oen or more of the intermediary blade sets simultaneously.

12. The multi-stage rotor according to claim 11, wherein the multi-stage rotor of the compressor stage of the machine is driven manually, electrically, electromagnetically, by transmission driven, by a turbine and/or by power nozzles on the multi-stage rotor.

13. The multi-stage rotor according to claim 12, wherein the machine is an air-compressor for delivering compressed air to a storage tank or for direct use;
is a supercharger for an engine, and further wherein the transmission is a chain and sprocket, a belt and pulley or a geared transmission powered by a power output shaft of the engine;
is a turbocharger for an engine, the multi-stage rotor being part of at least one of:
the compressor stage thereof and powered by the turbine stage of the turbocharger; and
the turbine stage thereof, the turbine stage of the turbocharger being driven by the exhaust flow of the engine; or
is a gas turbine including a combustor having an inlet port, through which compressed air from the exhaust port of the compressor stage is deliverable, and one or more exhaust nozzles through which high velocity exhaust gas is exhaustible from the combustor; and further wherein
the exhaust nozzles are mounted on the multi-stage rotor or the combustor, the combustor being stationary or rotatable with the multi-stage rotor, such that the thrust from the exhaust nozzles drives rotation thereof.

14. The multi-stage rotor according to claim 13, wherein the machine is a gas turbine engine further including:
a fan or propeller axially upstream of the compressor stage and located near the intake port thereof; and
a turbine stage along the exhaust nozzle and axially downstream of the combustor, the turbine stage being rotatably driven by the high velocity exhaust gas from the combustor for consequential rotary drive of the compressor stage and the fan.

15. The multi-stage rotor according to claim 14, wherein the multi-stage rotor makes up part of the turbine stage of the gas turbine engine.

16. The multi-stage rotor according to claim 15, wherein the gas turbine engine defines one or more bypass flow ducts for directing fluid from the intake port directly to the combustor, the turbine stage or into the exhaust nozzle downstream of the turbine stage.

17. An air compressor including:
a compressor stage comprising the multi-stage rotor of claim 1 rotatably housed within a compressor housing, the compressor housing defining:
an intake port for directing fluid flow inwardly into: (i) the radially innermost concentric blade set; or (ii) the radially outermost concentric blade set; of the multi-stage rotor; and
an exhaust port for directing fluid flow outwardly from the other of: (i) the radially outermost concentric blade set; or (ii) the radially innermost concentric blade set; of the multi-stage rotor; and
a drive input formation for inputting electrical or mechanical rotary drive to the multi-stage rotor of the compressor stage for compressing air passing through the compressor stage.

18. A turbocharger including:
a compressor stage comprising the multi-stage rotor of claim 1 rotatably housed within a compressor housing, the compressor housing defining:
an intake port for directing fluid flow inwardly into: (i) the radially innermost concentric blade set; or (ii) the radially outermost concentric blade set; of the multi-stage rotor; and
an exhaust port for directing fluid flow outwardly from the other of: (i) the radially outermost concentric blade set; or (ii) the radially innermost concentric blade set; of the multi-stage rotor;
a turbine stage comprising a turbine rotor, in the form of the multi-stage rotor of claim 1 or an alternatively configured turbine rotor, rotatably housed within a turbine housing, the turbine housing defining intake and exhaust ports through which exhaust flow from an engine is deliverable for rotatably driving the turbine rotor; and
a shaft connected between the turbine rotor and the multi-stage rotor of the compressor stage thereby to transmit rotary drive therebetween for compressing air passing through the compressor stage.

19. A gas turbine engine including:
a compressor stage comprising the multi-stage rotor of claim 1 rotatably housed within a compressor housing or engine casing defining:
an intake port for directing fluid flow inwardly into: (i) the radially innermost blade set; or (ii) the radially outermost blade set; of the multi-stage rotor; and an exhaust port for directing fluid flow outwardly from the other of: (i) the radially outermost blade set; or (ii) the radially innermost blade set; of the multi-stage rotor;

a combustor having an inlet port, through which compressed air from the exhaust port of the compressor stage is deliverable, and one or more exhaust nozzles through which high velocity exhaust gas is exhaustible from the combustor;

a turbine stage, located in a turbine housing or in the engine casing downstream of the combustor along the exhaust nozzle, comprising a turbine rotor in the form of the multi-stage rotor of claim 1 or an alternatively configured turbine rotor, the turbine stage being rotatably driven by the high velocity exhaust gas exhaustible from the combustor, for consequential rotary drive of the compressor stage.

20. The gas turbine engine according to claim 19 further including one or more of the following:

a fan or propeller axially upstream of the compressor stage and located near the intake port thereof, wherein the fan or the propeller are rotatably driven by the turbine stage;

one or more bypass flow ducts, defined by the engine casing, for directing fluid from the intake port directly to the combustor, the turbine stage or into the exhaust nozzle downstream of the turbine stage; and bleed valves along the compressor stage to bleed medium to high compressed fluid to be directed from the compressor for driving auxiliary devices.

21. The multi-stage rotor according to claim 2 including a plurality of guide vanes located along at least one of the ducts, and axially between the multiple rows of at least one of the axially spaced innermost, outermost and intermediary blade sets, wherein at least one of:

the guide vanes are mounted stationary relative to the rotors and in varying angles relative to the blade sets;

the spokes are shaped as lift generating blades; and the ducts include a moveable internal wall for altering at least one of the volume, pressure and velocity of the fluid, the moveable internal wall being controllable by one or more actuators.

22. The multi-stage rotor according to claim 6, wherein the duct ports of each of the innermost, the intermediary and the outermost ducts are separated by fluid flow separator formations having an axial dimension greater than the axial blade span of at least one of the blade sets rotatable within one or the other of the duct ports of such duct.

23. The multi-stage rotor according to claim 22, wherein the fluid flow separator formations are:

mounted between concentrically adjacent blade sets, on mount arms extending between the duct and the fluid flow separator formations, the fluid flow separator formations being the stationary part of the duct, cooperative with the rotating free ends of the blades, for generating a friction wash therebetween; or (i) the innermost, the outermost and the intermediary rings of the common rotor; or (ii) the inner and the outer rings of the independent rotors; each being rotatable with the respective rotor, and further wherein the ducts or a rotor housing comprise one or more friction plates, being the stationary part of the duct and extending axially into the gap defined radially beyond the free ends of the blades, for generating a friction wash therebetween.

\* \* \* \* \*